May 30, 1939.  G. O. AINSWORTH  2,160,051
CLUTCH CONTROL MECHANISM
Filed Nov. 7, 1935  2 Sheets-Sheet 1
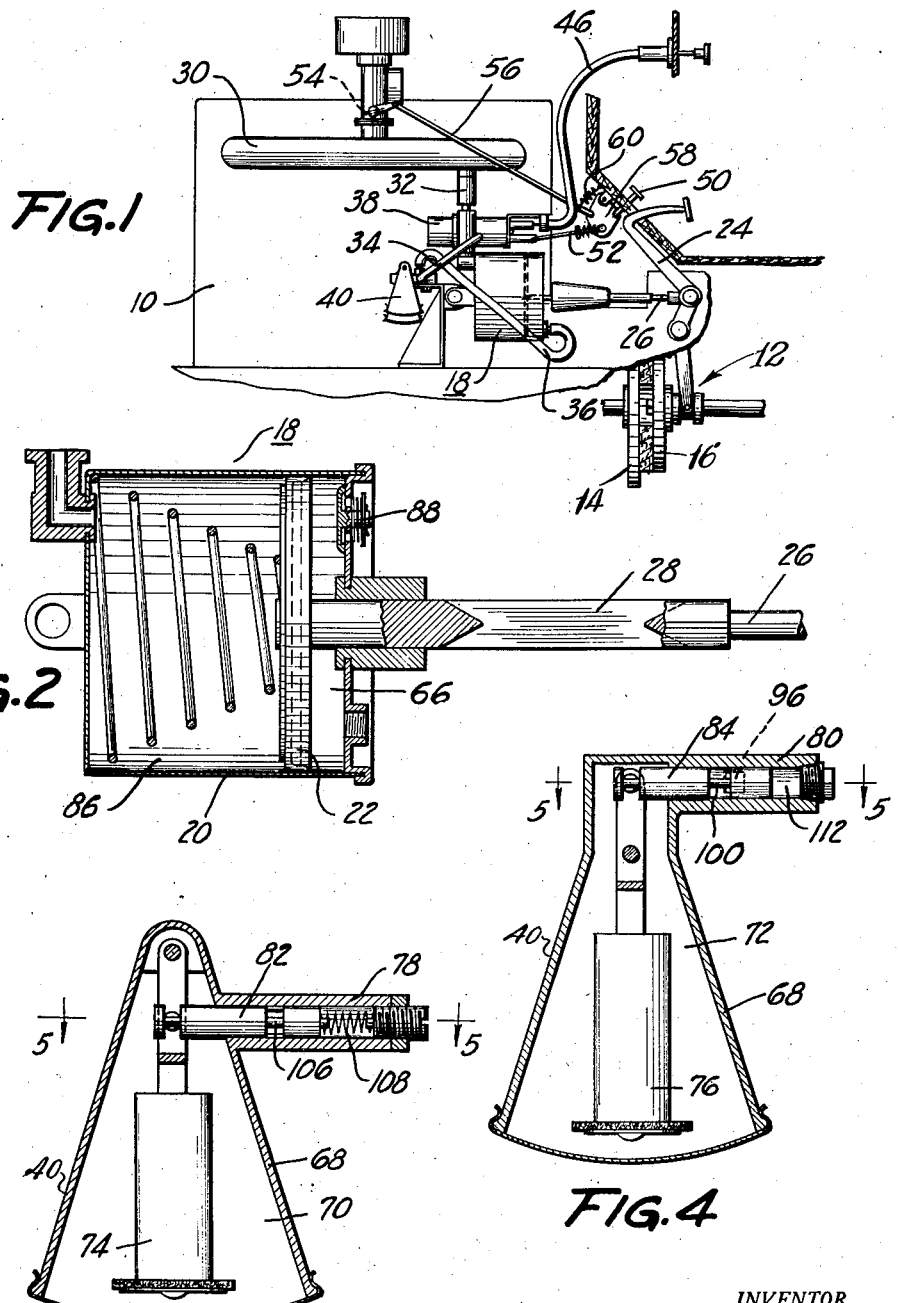
INVENTOR.
GEORGE O. AINSWORTH
BY H. O. Clayton
ATTORNEY May 30, 1939.    G. O. AINSWORTH    2,160,051
CLUTCH CONTROL MECHANISM
Filed Nov. 7, 1935    2 Sheets-Sheet 2
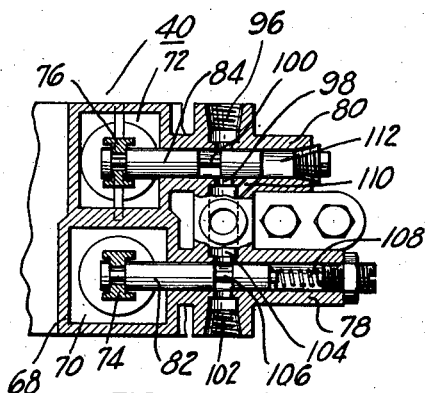
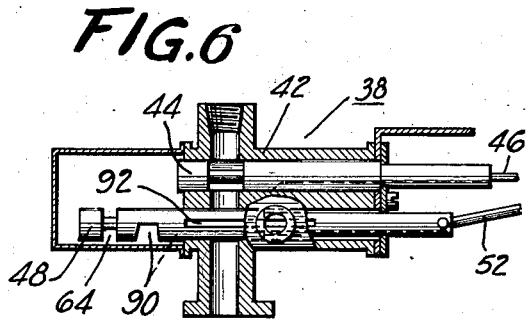
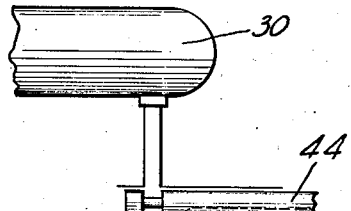
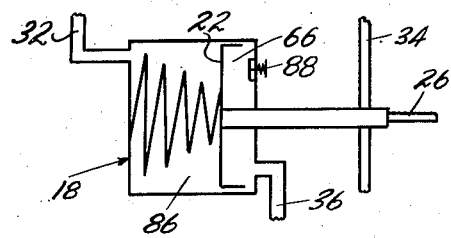
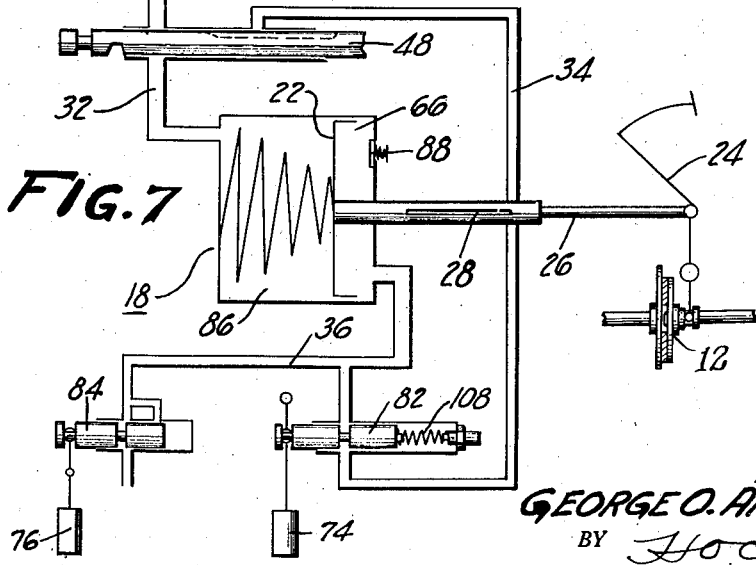
INVENTOR.
GEORGE O. AINSWORTH
BY H. O. Clayton
ATTORNEY Patented May 30, 1939

2,160,051

UNITED STATES PATENT OFFICE 2,160,051

CLUTCH CONTROL MECHANISM

George O. Ainsworth, Detroit, Mich., assignor to Bendix Products Corporation, South Bend, Ind., a corporation of Indiana Application November 7, 1935, Serial No. 48,727

6 Claims. (Cl. 192—.01)

This invention relates in general to the power plant of an automotive vehicle and in particular to power means for so operating a clutch of said plant as to simulate a conventional manual operation thereof.

An important object of the invention is to provide a clutch operator which will automatically compensate for wear of the clutch, and accordingly will need little, if any, servicing throughout the life of the clutch.

To this end there is provided in one embodiment of the invention a pressure differential operated motor, the flow of power fluid either to or from said motor being controlled by inertia operated valvular means operable at certain critical accelerations of the vehicle to automatically effect a controlled engagement of the clutch.

In another embodiment of the invention there is incorporated, in the linkage interconnecting the clutch with a clutch operating pressure differential operated motor, yieldable means automatically operated to compensate for clutch wear and to effect a smooth engagement of the clutch.

A further object of the invention is to provide a pendulum operated valve mechanism for a pressure differential operated clutch operator, said mechanism being operable at a critical vehicle acceleration to both check the engagement of the clutch and to limit the vehicle acceleration to a predetermined maximum, thereby obviating all undesirable jerking of the vehicle by the action of the clutch.

A further object of the invention is to provide a hydraulic type of clutch control mechanism operable to effect a rapid engagement of the clutch until the plates thereof contact one with another and then to effect a smooth completion of the clutch engagement.

Other objects of the invention and desirable details of construction and combinations of parts will become apparent from a detailed description of certain embodiments of the invention, described in detail in the following specification taken in conjunction with the accompanying drawings illustrating said embodiments, in which:

Figure 1 is a diagrammatic view of the clutch control mechanism constituting my invention;

Figure 2 is a sectional view of the clutch operating pressure differential motor of the mechanism of Figure 1;

Figure 3 is a sectional view of one of the inertia operated bleed valves of Figure 1;

Figure 4 is a sectional view of the other of the inertia operated bleed valves of Figure 1;

Figure 5 is a sectional view of the two inertia operated bleed valves of the mechanism of Figure 1, said figure being taken on the line 5—5 of Figure 3 and on the line 5—5 of Figure 4;

Figure 6 is a sectional view of the combined three-way and cut-out valve of Figure 1;

Figure 7 is a schematic view of the clutch control mechanism of Figure 1; and

Figure 8 is a view, similar to part of Figure 7, disclosing a modified form of clutch motor.

Referring now to Figure 1 of the drawings, there is disclosed a conventional internal-combustion engine 10 and a conventional disc clutch 12 including the usual driving element 14 and driven element 16.

The invention is directed to power means for so controlling the operation of the clutch as to accurately simulate a skillful manual operation thereof. To this end there is provided a vacuum operated pressure differential motor 18 comprising a cylinder 20 and a piston 22, the latter being connected to the driven element 16 of the clutch, through the intermediary of a clutch pedal 24, by a connecting rod 26 slotted at 28 for a purpose to be described hereinafter. The motor 18 is placed in fluid transmitting connection with an intake manifold 30 of the engine 10 by means of conduits 32, 34 and 36, said conduits being interconnected by a combined three-way and cut-out valve 38 and by an inertia operated valve mechanism 40.

Valve unit 38, detailed in Figure 6, forms no part of the instant invention and is, therefore, only briefly described herein. The same comprises a casing 42 provided with juxtaposed bores housing respectively a three-way cut-out valve plunger 44, operable from the dash by a Bowden wire connection 46, and a three-way valve plunger 48, operably connected with an accelerator 50 by means of a link 52. The accelerator is operably connected to a throttle 54 by means of a link 56 and lever 58, a spring 60 serving to return the accelerator to its closed throttle position and also serving to position the valve plunger 48 to interconnect the manifold with the motor 18. Said latter connection is made via a recess 64 in the plunger 48 when the accelerator is released.

The essence of the invention is directed to inertia operated means for controlling the flow of air either to or from the motor 18 to control the engagement of the clutch. In the modification disclosed in Figures 1 to 7 of the drawings, the flow of air is controlled from a compartment 66 constituting the compression side of the motor.

To the above end there is provided a valve casing 68, Figures 3, 4 and 5, comprising two compartments 70 and 72, housing pendulum members 74 and 76. The casing is further fashioned to provide valve casings 78 and 80 bored to receive reciprocable valve plungers 82 and 84 connected respectively to the pedulums 74 and 76.

Describing now the operation of the aforementioned mechanism, upon release of the accelerator 50 the throttle is closed, effecting, by virtue of the pumping action of the motor pistons, a partial evacuation of the manifold 30. The release of the accelerator, as previously described, actuates the valve plunger 48 to interconnect the manifold with the motor, or rather a suction compartment 86 of the motor: said compartment is thus evacuated and the atmosphere, entering the compartment 66 via check valve 88, serves to load the piston 22, moving the same to the left, Figure 2, to disengage the clutch.

When it is desired to reengage the clutch, i. e., after an operation of the change-speed transmission, the accelerator is depressed, whereupon the valve plunger 48, Figure 6, is moved to the left to interconnect the compartment 66 of the clutch motor with the atmosphere via an atmospheric port 90 and a tapered bleed slot 92 in the plunger. The engagement of the clutch is thus initiated under the action of the conventional clutch springs. The rate of engagement is determined by the mode of egress of air from the motor compartment 66, the slot 28, valves 82 and 84 and slot 92 performing this function. The air passes from the compartment 66 relatively rapidly to effect a rapid clutch engaging movement of the driven clutch element 16, until the piston 22 has moved sufficiently to move the slot 28, Figure 2, out of registry with the compartment 66. Thereafter the egress of air from the compartment is effected solely via the valves 82 and 84 and slot 92 in valve 48.

Coming now to the essence of the invention, when the clutch elements contact sufficiently to accelerate the vehicle either from a standing start or when the vehicle is in motion, the pendulum 76 is automatically actuated to move the valve 84 sufficiently to cut off a vent to the atmosphere via conduit 36, ports 96 and 98 and a recess 100 in the valve, Figure 5. The remainder of the air is vented from the compartment 66 to cushion the engagement of the clutch via conduit 36, ports 102 and 104, Figure 5, a recess 106 in valve 82, conduit 34 and the tapered bleed slot 92 in the three-way valve plunger 48, Figure 6. If desired, the slot 28 may be dispensed with as shown in Figure 8, thus more abruptly changing the rate of engagement of the clutch, when the clutch plates contact one with another.

Should the accelerator be depressed too far to expose too much of the slot 92 to the conduit 34, the clutch plates are compressed to a degree sufficient to jerk the vehicle. In this event the pendulum 74 goes into action to move the valve 82, against the action of an adjustably loaded spring 108, sufficiently to cut off the bleed to the slot 92, and accordingly hold the clutch engaged to effect a slipping action thereof. When the acceleration factor has been reduced sufficiently to move the pendulum back to its original position or substantially to such position, the bleed of air and the engagement of the clutch are resumed to complete the engagement.

A duct 110 in the valve casing serves to interconnect a valve compartment 112, Figure 5, with the duct 98 and compartment 66 to hold the valve 84 in its cut off position until the clutch is engaged.

There are thus provided two inertia operated valves, one being automatically operable to abruptly slow down the clutch engagement when the clutch plates contact, thus compensating for plate wear, and the other being automatically operable to limit the acceleration of the vehicle to a factor which is unobjectionable to the passengers.

There is thus provided power means for both disengaging the clutch and so controlling the engagement thereof as to simulate a manually controlled clutch. The clutch is moved into engagement relatively rapidly until the plates contact, whereupon the rate of engagement is determined by the position of the accelerator, the latter also functioning to initiate the clutch disengaging and engaging operations of the pressure differential motor.

Although this invention has been described in connection with certain specific embodiments, the principles involved are susceptible of numerous other applications that will readily occur to persons skilled in the art. The invention is, therefore, to be limited only as indicated by the scope of the appended claims.

I claim:

1. In an automotive vehicle provided with a clutch including driving and driven members, a unitary power means for both disengaging the clutch and controlling the engagement thereof, said power means comprising a pressure differential operated motor, valve means for controlling the clutch engaging operation of said motor including a plurality of inertia operated valve members automatically operable at predetermined accelerations of the vehicle to vary the rate of clutch engagement.

2. In an automotive vehicle provided with a clutch comprising driving and driven members, a unitary power means for so operating said clutch as to disengage the same and control the engagement thereof in a manner simulating an expert manually controlled engagement of the clutch, said power means comprising a pressure differential operated motor operably connected to the clutch, a fluid transmitting connection connected to said motor, a valve member incorporated in said connection, said valve being operative, when the vehicle is being accelerated at or above a predetermined factor, to restrict the flow of fluid through said connection and effect a slipping clutch, and inertia operated means operative, at any acceleration of the vehicle effected by the clutch, to so impede the flow of fluid within said motor as to decelerate the clutch engaging movement of the driven clutch member.

3. In an automotive vehicle provided with a clutch having driving and driven elements, power means for operating the clutch to disengage the same and control its engagement, said power means comprising two separate inertia operated valves, one of said valves being automatically operable, at a critical acceleration of the vehicle, to slow down the engagement of the clutch, and the other of said valves being automatically operable, at another critical acceleration of the vehicle, to effect a slipping clutch.

4. In an automotive vehicle provided with a clutch having driving and driven elements, power means for operating the clutch to disengage the same and control its engagement, said power means comprising two separate inertia operated valves, each operable at different accelerations of the vehicle to control the engagement of the clutch, one of said valves being automatically operable, at a critical acceleration of the vehicle, to slow down the engagement of the clutch, and the other of said valves being automatically operable, when the vehicle is accelerated to another degree, to effect a slipping clutch.

5. In an automotive vehicle provided with a clutch, power means for operating the clutch including a valve casing, and two separate interconnected inertia operated bleed valve units mounted within said casing, each of said units being operable to in part control the engagement of the clutch.

6. In an automotive vehicle provided with a clutch, power means for operating the clutch comprising a pressure differential operated motor, fluid transmitting means connected to said motor, and two separate inertia operated valves incorporated in parallel relation in said fluid transmitting means.

GEORGE O. AINSWORTH.